(12) United States Patent
Oguchi

(10) Patent No.: US 8,155,644 B2
(45) Date of Patent: Apr. 10, 2012

(54) WIRELESS COMMUNICATION SYSTEM FOR SWITCHING TO A PREFERRED CARRIER

(75) Inventor: Naoki Oguchi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 118 days.

(21) Appl. No.: 12/816,678

(22) Filed: Jun. 16, 2010

(65) Prior Publication Data
US 2010/0323691 A1 Dec. 23, 2010

(30) Foreign Application Priority Data
Jun. 17, 2009 (JP) .................................. 2009-143874

(51) Int. Cl.
*H04W 4/00* (2009.01)
(52) U.S. Cl. .................................. 455/432.1; 455/422.1
(58) Field of Classification Search .......................... None
See application file for complete search history.

(56) References Cited

U.S. PATENT DOCUMENTS

| | | | | |
|---|---|---|---|---|
| 2009/0170495 | A1* | 7/2009 | Blum et al. | 455/419 |
| 2010/0048205 | A1* | 2/2010 | Guilford et al. | 455/432.1 |
| 2010/0234037 | A1* | 9/2010 | Terry et al. | 455/450 |

FOREIGN PATENT DOCUMENTS
WO 2006055716 A1 5/2006
* cited by examiner

*Primary Examiner* — Ajit Patel
(74) *Attorney, Agent, or Firm* — Murphy & King, P.C.

(57) ABSTRACT

A wireless communication system, including: a first wireless base station disposed on a first wireless network; a second wireless base station disposed on a second network; and a mobile station that includes a communication controller, which controls wireless communication; wherein in the case where the mobile station attempts to switch communication to the second wireless network while coupled to the first wireless base station and communicating on the first wireless network, the communication controller temporarily synchronizes with the second wireless base station, and obtains an address pointer for acquiring network configuration information from the second wireless base station, the network configuration information containing information regarding the network configuration of the second wireless network, and after obtaining the address pointer, the communication controller recouples with the first wireless base station, accesses the data acquisition location specified by the address pointer via the first wireless network, and acquires the network configuration information.

8 Claims, 15 Drawing Sheets

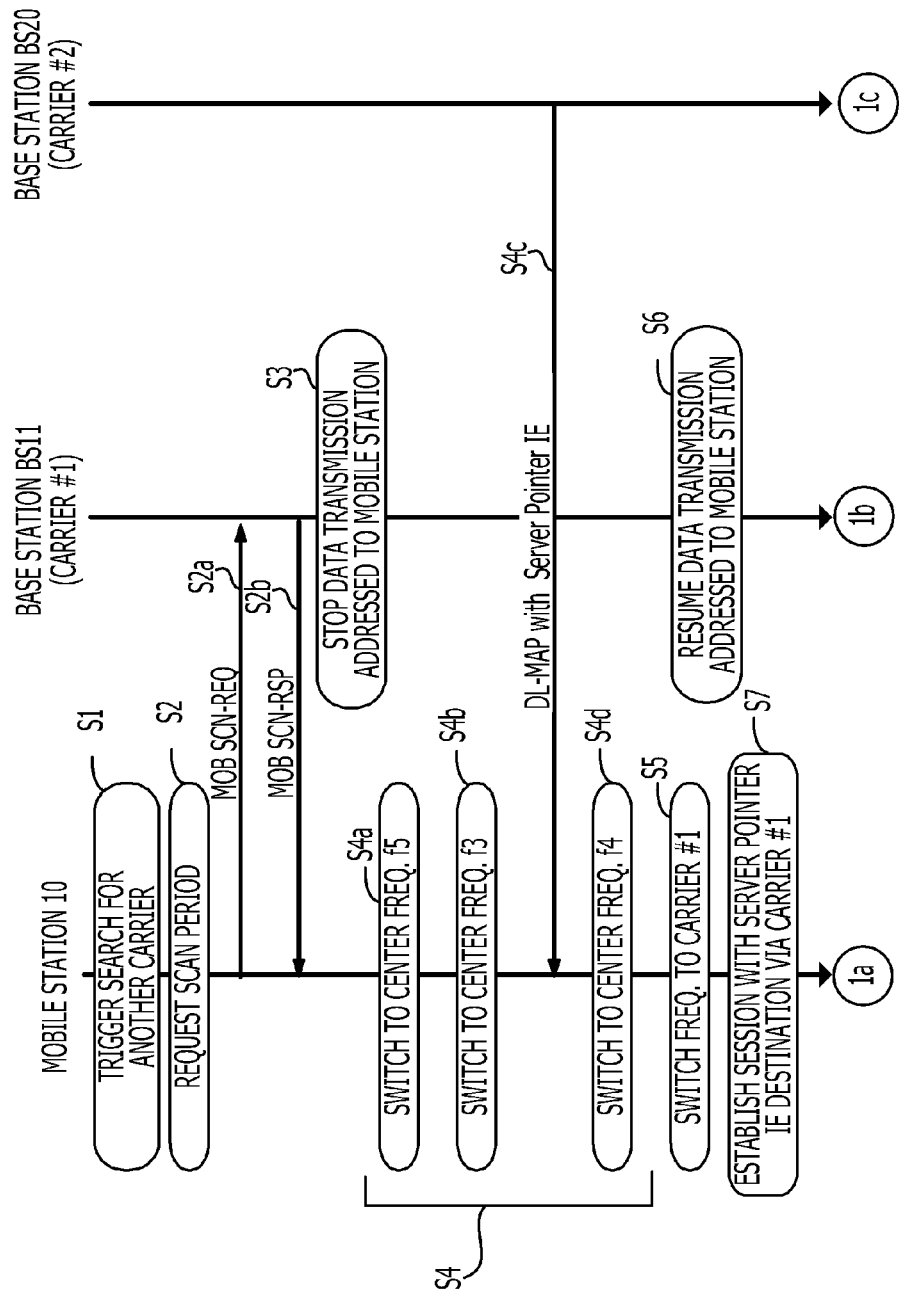

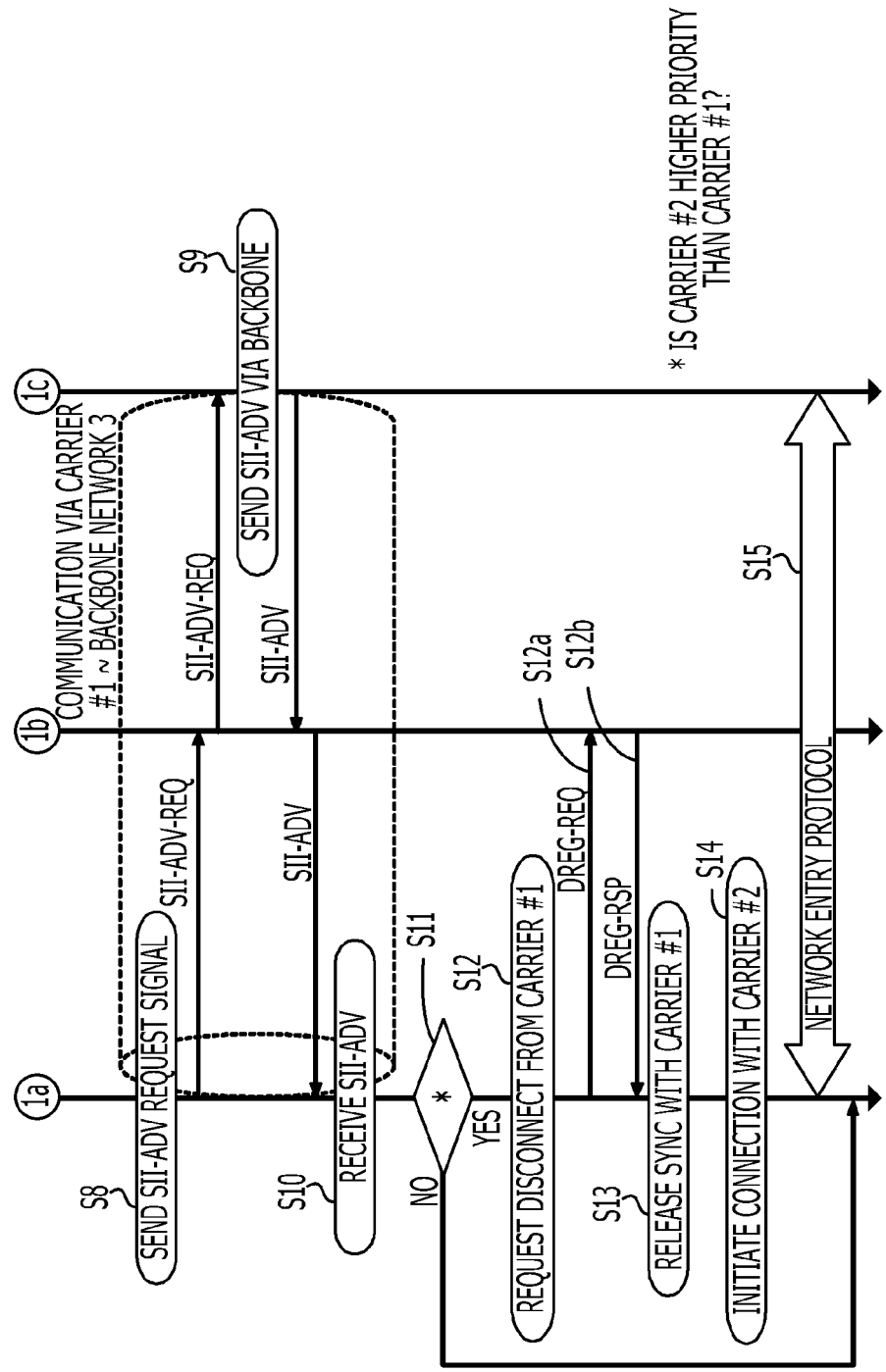

| ENTRY NO. | CENTER FREQ. [GHz] | BANDWIDTH [MHz] |
|---|---|---|
| 1 | 2.501 (=f5) | 10 |
| 2 | 2.511 (=f3) | 10 |
| 3 | 2.521 (=f4) | 10 |
| 4 | 2.531 (=f2) | 10 |
| 5 | 2.541(=f1) | 10 |
| 6 | 2.551(=f0) | 10 |

FIG. 8

| Syntax | Size(bit) | Notes |
|---|---|---|
| Server_pointer_IE() { | — | — |
| Extended DIUC | 4 | EX. 0x09 (NEW CODE USED AS Server_Pointer IE) |
| Length | 4 | Length in bytes |
| Server FQDN | Max255bytes | Fully Qualified Domain Name |
| SII ADV version | 16 | |
| } | — | — |

FIG. 9

| Syntax | Size(bit) | Notes |
|---|---|---|
| SII_ADV - req() { | — | — |
| Management message type=70 | 8 | message type=70 is an example |
| TLV type=150 | 8 | Type=150 is an example |
| Length | 8 | =32 |
| MS IP Address | 32 | |
| TLV type=151 | 8 | Type=151 is an example |
| Length | 8 | =24 |
| NAP ID | 24 | — |
| } | | |

FIG. 10

| Syntax | Size(bit) | Notes |
|---|---|---|
| SII_ADV() { | — | — |
| Management message type=68 | 8 | |
| TLV type=133 | 8 | |
| Length | 8 | Length in bytes=3 × n bytes |
| NSP ID(1) | 24 | 0xBBBBBB |
| NSP ID(2) | 24 | 0xCCCCCC |
| ... | ... | |
| NSP ID(n) | 24 | |
| TLV type=132 | 8 | |
| Verbose NSP Name Length(1) | 8 | $L_1$ bytes (MAX255bytes) |
| Verbose NSP Name(1) | 8 × $L_1$ | Nocty Communication |
| Verbose NSP Name Length(2) | 8 | $L_2$ bytes (MAX255bytes) |
| Verbose NSP Name(2) | 8 × $L_2$ | BAGLOBE Corporation |
| ... | ... | ... |
| Verbose NSP Name Length(n) | 8 | $L_n$ bytes (MAX255bytes) |
| Verbose NSP Name(n) | 8 × $L_n$ | |
| } | — | — |

| NAP ID(24bit) | Candidate ID | NSP ID(24bit) | Verbose NSP Name |
|---|---|---|---|
| 0x222222 | 1 | 0xBBBBBB | Nocty Communication |
| 0x222222 | 2 | 0xCCCCCC | BAGLOBE Corporation |

FIG. 12

| PRIORITY | Preferred NSP | NSP ID(24bit) |
|---|---|---|
| 1 | Nocty | 0xBBBBBB |
| 2 | BAGLOBE | 0xCCCCCC |

| PRIORITY | Preferred NAP | NAP ID(24bit) |
|---|---|---|
| 1 | TTC | 0x333333 |
| 2 | Wireless ONE | 0x222222 |
| 3 | Eastern Telecom | 0x111111 |

WIRELESS COMMUNICATION SYSTEM FOR SWITCHING TO A PREFERRED CARRIER

CROSS-REFERENCE TO RELATED APPLICATIONS

This application is based upon and claims the benefit of priority from the prior Japanese Patent Application No. 2009-143874, filed on Jun. 17, 2009, the entire contents of which are incorporated herein by reference.

FIELD

The present technology relates to wireless communication systems. Such wireless communication systems may include, for example, mobile communication systems.

BACKGROUND

In some cases, one of the functions sought after in a mobile station is the ability to search for another carrier (i.e., a wireless network operated by a communication service provider) while the mobile station is communicating with a specific carrier. For example, the mobile station's contracted carrier signal might not be found at the current location, but an accessible roaming carrier might exist.

Communicating wirelessly via roaming incurs more costs than the originally-contracted communication charges. For this reason, the mobile station may also search for a contracted carrier signal at a fixed time interval while connected (coupled) and communicating on a roaming carrier. When it finds the contracted carrier, the mobile station then re-connects (re-couples) to the contracted carrier.

To execute such a carrier switching control, the mobile station typically attempts to synchronize to a known or unknown frequency and acquires network configuration information regularly broadcast from the base station via a synchronized base station.

Network configuration information is information indicating the Network Service Providers (NSPs) to which the carrier (also referred to as the Network Access Provider (NAP)) is connected. The NSPs provide various Internet services to the user. Via the base station, the mobile station acquires such network configuration information, and determines whether or not the carrier is appropriate for connection.

Meanwhile, a broadband wireless access system known as WiMAX (Worldwide Interoperability for Microwave Access: IEEE 802.16e 2005, 802.16 Rev2 D8, WiMAX Forum WiMAX End-to-End Network Systems Architecture (Stage 3: Detailed Protocols and Procedures)) exists. WiMAX defines a protocol known as Network Discovery (hereinafter abbreviated as NWD), which stipulates the procedure by which a mobile station searches for a carrier and connects to a desired carrier as described above.

The NWD procedure involves the mobile station successively attempting to synchronize with a frequency registered in advance, or with all frequencies in a radio frequency (RF) profile. If synchronization is achieved, the mobile station receives a Service Identify Information Advertisement (SII-ADV) message (herein corresponding to the network configuration information) regularly broadcast by the carrier.

An example of the related art in carrier-switching technology is given in International Publication WO2006/055716.

SUMMARY

According to an aspect of the invention, a wireless communication system, including: a first wireless base station disposed on a first wireless network; a second wireless base station disposed on a second wireless network; and a mobile station that includes a communication controller, which controls wireless communication; wherein, in the case where the mobile station attempts to switch communication to the second wireless network while coupled to the first wireless base station and communicating on the first wireless network, the communication controller temporarily synchronizes with the second wireless base station, obtains an address pointer for acquiring network configuration information of the second wireless network from the second wireless base station, and recouples with the first wireless base station after obtaining the address pointer, accesses the data acquisition location specified by the address pointer via the first wireless network, and acquires the network configuration information.

The object and advantages of the invention will be realized and achieved by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIGS. 6A and 6B are sequence diagrams illustrating carrier-switching operation;

FIG. 7 illustrates an exemplary configuration of a frequency information table;

FIG. 8 illustrates an exemplary format of a Server Pointer IE message;

FIG. 9 illustrates an exemplary format of an SII-ADV request message;

FIG. 10 illustrates an exemplary format of an SII-ADV message;

FIG. 11 illustrates exemplary information set in a network configuration information table;

FIG. 12 illustrates an exemplary configuration of a preferred NSP list;

FIG. 13 illustrates an exemplary configuration of a preferred NAP list; and

DESCRIPTION OF EMBODIMENTS

When a mobile station switches from its currently-connected carrier to another carrier, it first suspends communication with the currently-connected carrier. With WiMAX, for example, a carrier-switching control such as NWD is conducted during this suspended period, and an SII-ADV or similar network configuration information is acquired. (By comparison, consider the case of two base stations bs1 and bs2 operated by the same carrier, wherein the mobile station is switched from the currently-connected base station bs1 to the other base station bs2, without interrupting the communication. Such switching control is referred to as a hand-over, and differs from carrier switching that involves switching service providers.)

However, in the related art, when a mobile station executes switching control to switch to another carrier while currently connected to a first carrier, the communication cut-off time with the currently-connected carrier might become lengthy, and communication quality might be lowered.

Figure 14:
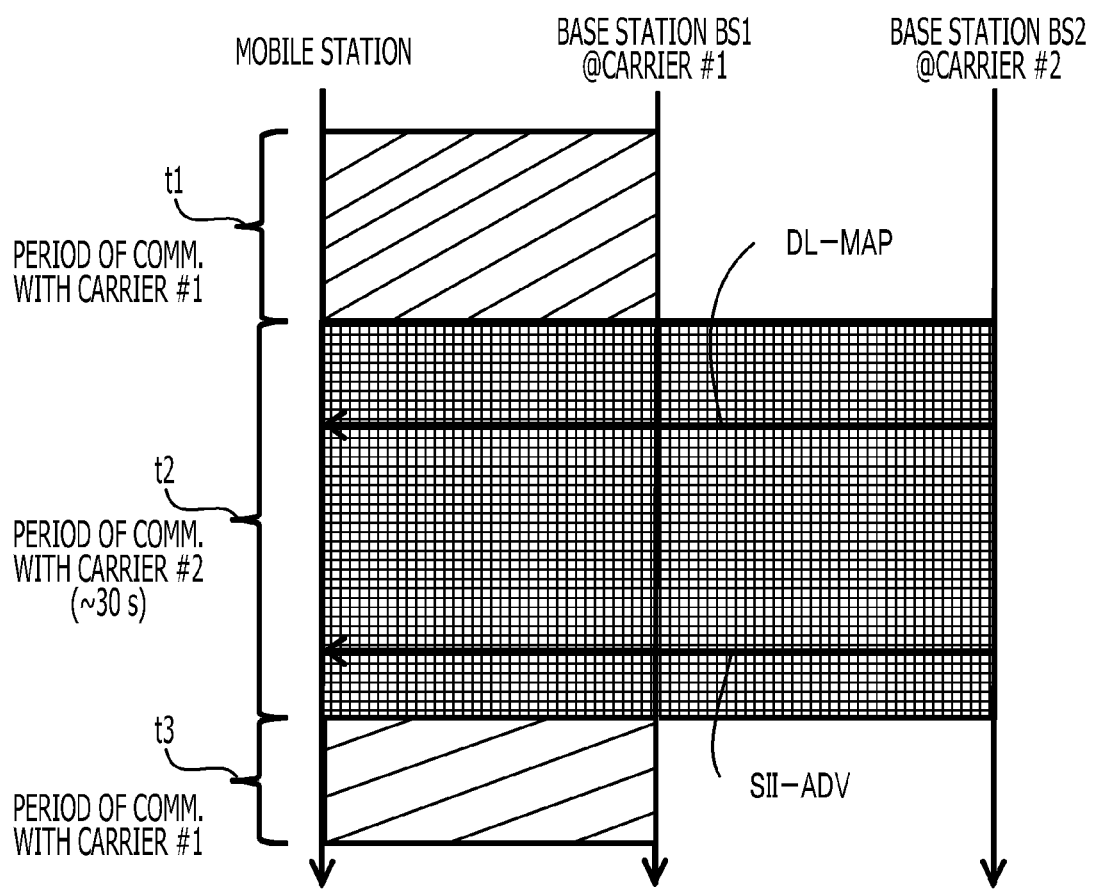
FIG. 14 illustrates a carrier-switching control sequence of the related art.

FIG. 14 illustrates a carrier-switching control sequence of the related art. A carrier-switching control will be hereinafter described, using WiMAX as an example. In the following, the base station BS1 is taken to be the base station of a carrier #1 to which the mobile station is currently connected, while the base station BS2 is taken to be the base station of a carrier #2 (i.e., a different provider from carrier #1).

[Communication period t1] The mobile station MS is connected to and wirelessly communicates with the base station BS1.

[Communication period t2] When switching carriers, the mobile station MS executes a search for another carrier using NWD. In particular, the mobile station MS first suspends communication with the base station BS1, and successively attempts to synchronize with another base station by switching to a frequency registered in advance, or to all frequencies in the RF profile in use.

Once synchronization with the base station BS2 is achieved, the mobile station MS receives downlink map (DL-MAP) information from the base station BS2, which states various initialization parameters for communicating with the base station BS2. The mobile station MS then receives the regularly broadcasted SII-ADV (i.e., network configuration information).

Based on the acquired SII-ADV, the mobile station MS determines whether or not the connected base station BS2 is the base station of a desired carrier. If the base station BS2 is recognized as the base station of a desired carrier, then the mobile station MS stays connected to and communicates with the base station BS2. In contrast, if the base station BS2 is not the base station of a desired carrier, then the mobile station MS disconnects from the base station BS2, reconnects with the base station BS1, and resumes wireless communication.

[Communication period t3] It is determined that the base station BS2 is not the base station of a desired carrier, so the mobile station MS disconnects from the base station BS2, reconnects with the base station BS1, and resumes wireless communication.

As described above, in the carrier-switching control of the related art, a DL-MAP is received from the synchronized base station BS2 and then network configuration information is received. This increases the connection time with the base station BS2. In some cases, the mobile device MS may remain connected to the base station BS2 for close to 30 seconds before the network configuration information is acquired (in other words, communication with the base station BS1 is interrupted for close to 30 seconds).

In this way, when executing carrier-switching control to switch to another carrier while the mobile station is currently connected to a first carrier, it is possible for the communication cut-off time, during which communication with the currently-connected carrier is interrupted, to become extremely large. This in turn leads to degraded communication quality.

Moreover, although the foregoing description takes WiMAX by way of example, a similar problem occurs with the carrier-switching controls for other wireless techniques.

In light of such issues, the present technology has an object to provide a wireless communication system that shortens the carrier searching time of a mobile device, thereby making it possible to improve communication quality.

Figure 1:
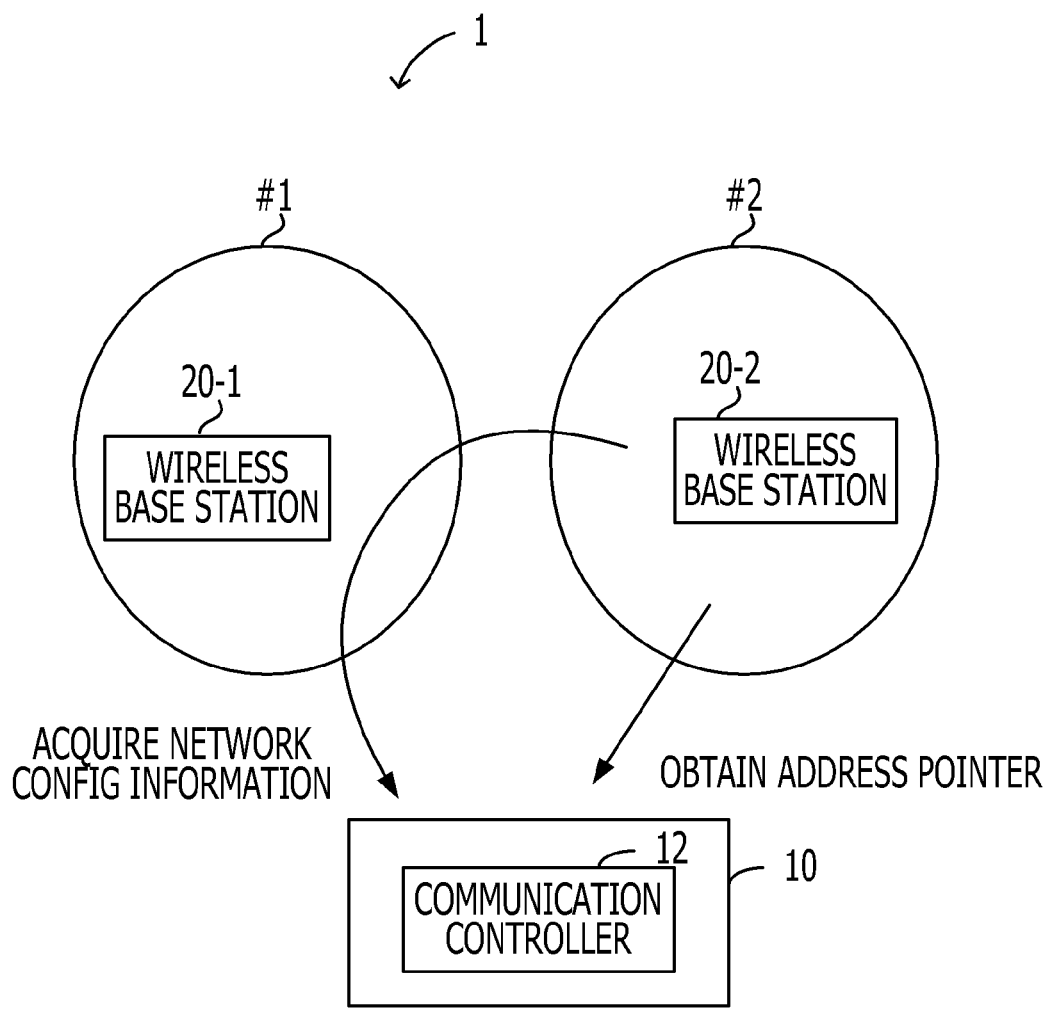
FIG. 1 illustrates an exemplary configuration of a wireless communication system.

Hereinafter, embodiments of the present invention will be described with reference to the accompanying drawings. FIG. 1 illustrates an exemplary configuration of a wireless communication system. The wireless communication system 1 is provided with a base station 20-1 (a first wireless base station) disposed on a wireless network #1 (a first wireless network), a base station 20-2 (a second wireless base station) disposed on a wireless network #2 (a second wireless network), and a mobile station 10.

The mobile station 10 includes a communication controller 12 that controls wireless communication. When attempting to switch communication to the wireless network #2 while the mobile station 10 is connected to and communicating with the wireless network #1, the communication controller 12 typically synchronizes with the base station 20-2 and obtains an address pointer (pointer information) from the base station 20-2 to acquire network configuration information containing information on the network configuration of the wireless network #2. After obtaining the address pointer, the communication controller 12 reconnects with the base station 20-1, accesses the data acquisition location specified by the address pointer via the wireless network #1, and acquires the network configuration information.

Figure 2:
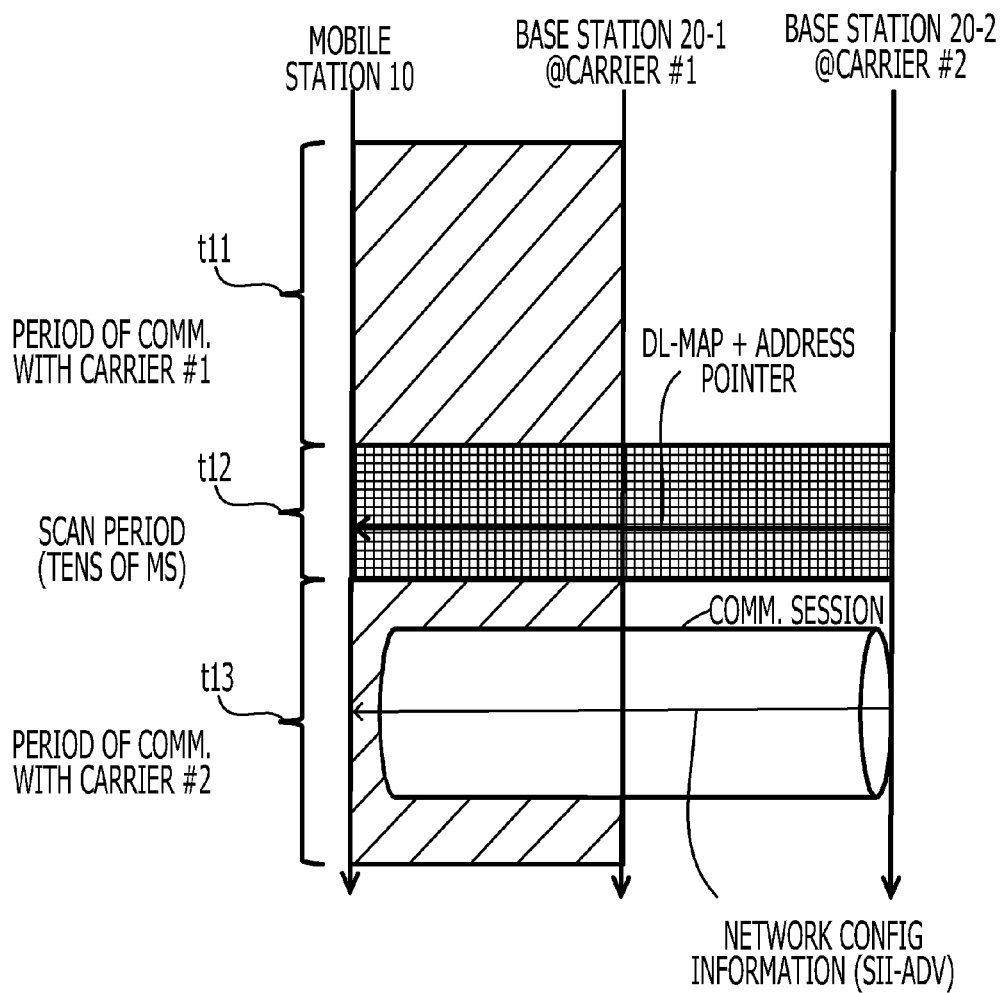
FIG. 2 illustrates an operational sequence of a wireless communication system.

Application of the wireless communication system 1 to a WiMAX wireless network will now be described. FIG. 2 illustrates an operational sequence of the wireless communication system 1.

[Communication period t11] The mobile station 10 is connected to and wirelessly communicates with the base station 20-1 disposed on the carrier #1 (herein corresponding to the wireless network #1).

[Communication period t12] When switching carriers, the mobile station 10 first requests a scan period. The parameters of this scan period are defined in the IEEE 802.16e specification. In the IEEE 802.16e specification, the scan period is used to search for another base station other than the base station 20-1 on the currently-connected carrier #1. However, in the present system, this scan period is used to search for a base station on the other carrier #2 (herein corresponding to the wireless network #2).

During the scan period, the mobile station 10 searches for a syncable base station on carrier #2. Where that base station is the base station 20-2, the mobile station 10 temporarily synchronizes with and receives a DL-MAP containing an address pointer from the base station 20-2. Herein, the scan period is an amount of time equal to several tens of milliseconds.

[Communication period t13] Upon obtaining the DL-MAP with an attached address pointer, the mobile station 10 once again connects to the base station 20-1 on the carrier #1, establishes a communication session to the data acquisition location specified by the address pointer, and acquires network configuration information for the carrier #2 via the originally connected carrier #1.

In the related art, when switching from a currently-connected carrier to another carrier, the mobile station first searches for a syncable base station on the other carrier. Once found, the mobile station remains connected to that base station and continues to wait for the network configuration information for the other carrier regularly sent from that base station.

In contrast, the present system is configured as follows. The mobile station 10 first searches for a syncable base station on the carrier #2. Once the syncable base station 20-2 is found, the mobile station 10 acquires an address pointer from the base station 20-2, indicating the acquisition location of network configuration information for the carrier #2, and then disconnects from the base station 20-2. The mobile station 10 then reconnects with the base station 20-1 on the original carrier #1, accesses the data acquisition location specified by the address pointer via the carrier #1, and then acquires the network configuration information via the carrier #1 to which the mobile station 10 is currently connected.

As a result, the communication time between the mobile station 10 and the carrier #2 becomes equal to just the short amount of time for the scan period. It therefore becomes possible to greatly shorten the interruption of communication with the currently-connected carrier #1, making it possible to improve communication quality.

Figure 3:
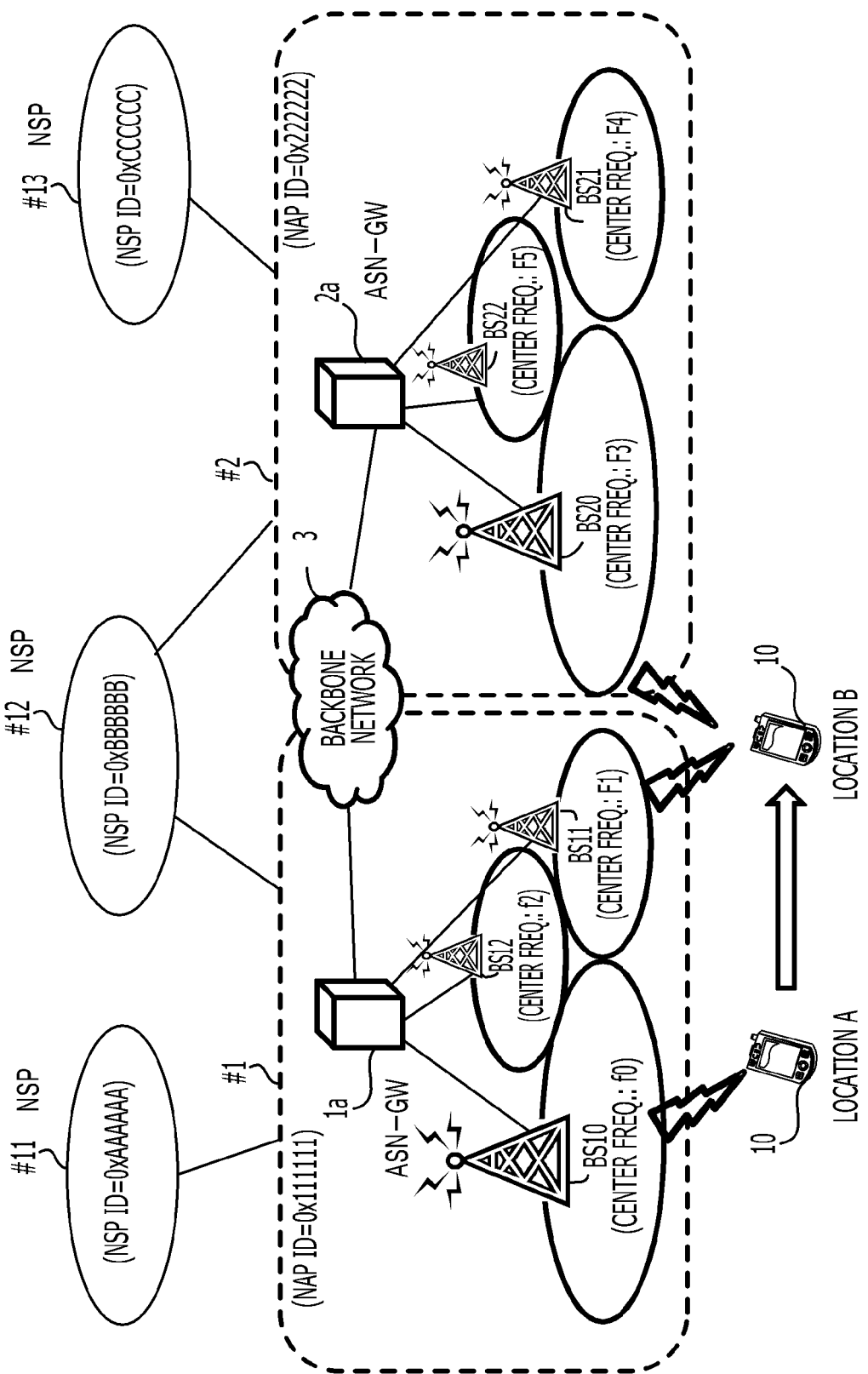
FIG. 3 illustrates an exemplary configuration of a wireless network.

Next, a specific WiMAX wireless network will be illustrated, with its operation described in further detail. FIG. 3 illustrates an exemplary configuration of a wireless network. FIG. 3 illustrates a network configuration for the case wherein two carriers (carrier #1 and carrier #2) conducting WiMAX communication are adjacent to each other.

The carrier #1 is a wireless network that includes an Access Service Network-Gateway (ASN-GW) 1a, as well as base stations BS10 to BS12. The ASN-GW 1a connects to the base stations BS10 to BS12 and distributes address pointers to the base stations BS10 to BS12 under its control. In addition, the base stations BS10 to BS12 send and receive frames using the center frequencies f0 to f2, respectively.

The carrier #2 is a wireless network that includes an ASN-GW 2a, as well as base stations BS20 to BS22. The ASN-GW 2a connects to the base stations BS20 to BS22 and distributes address pointers to the base stations BS20 to BS22 under its control. In addition, the base stations BS20 to BS22 send and receive frames using the center frequencies f3 to f5, respectively.

The ASN-GW 1a of the carrier #1 and the ASN-GW 2a of the carrier #2 are respectively connected by a backbone network 3 and are able to communicate to each other. Furthermore, the carrier #1 is connected to the NSP networks NSP #11 and NSP #12, while the carrier #2 is connected to the NSP #12 and NSP #13.

The carrier #1 holds carrier-identifying information in the form of a NAP identifier (NAP-IP) and is assigned a NAP-ID value of 0x111111. The carrier #2 also holds a carrier-identifying NAP-ID and is assigned a NAP-ID value of 0x222222.

Furthermore, the NSP #11, NSP #12, and NSP #13 likewise hold NSP-identifying identifiers and are assigned NSP-ID values of 0xAAAAAA, 0xBBBBBB, and 0xCCCCCC, respectively.

Figure 4:
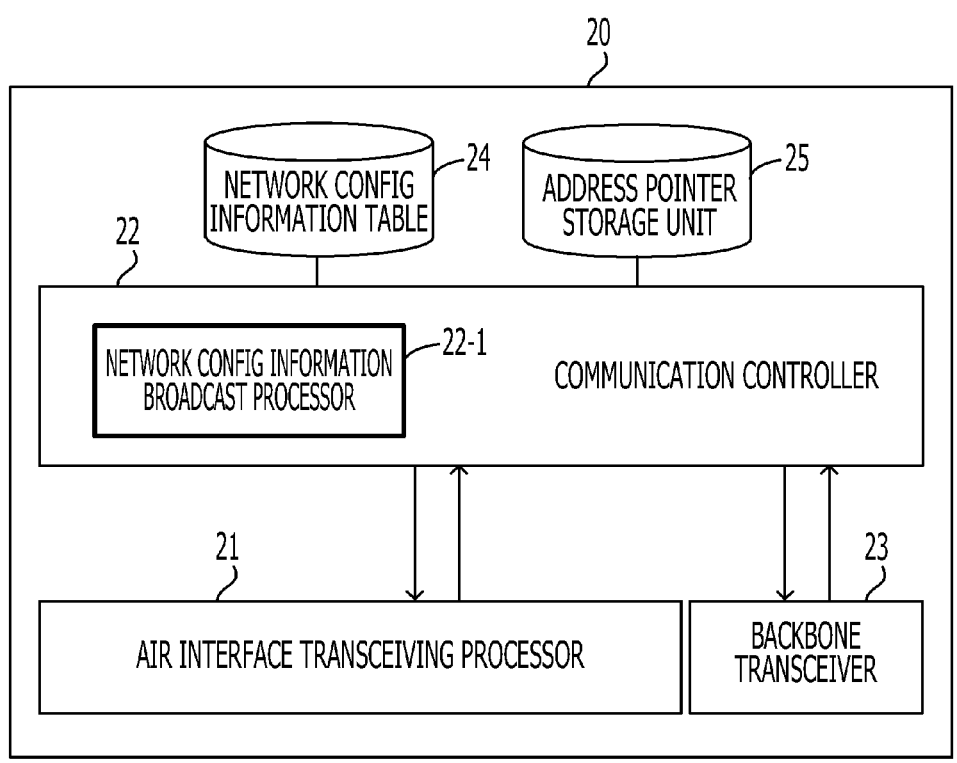
FIG. 4 illustrates an exemplary configuration of a base station.

FIG. 4 illustrates an exemplary configuration of a base station. The base station 20 is provided with an air interface transceiving processor 21, a communication controller 22, a backbone transceiver 23, and a network configuration information table 24. The communication controller 22 includes a network configuration information broadcast processor 22-1.

The air interface transceiving processor 21 converts various messages into radio waves and then transmits the radio waves to a mobile station. The air interface transceiving processor 21 also converts radio waves received from a mobile station into electrical signals, retrieves messages from such electrical signals, and then passes the retrieved messages to respective processors.

The communication controller 22 executes processes for maintaining and controlling communication with a mobile station, exchanging control messages with a gateway apparatus (ASN-GW), or exchanging control messages with a mobile station. In addition, the communication controller 22 sends messages to the air interface transceiving processor 21 and receives, from the air interface transceiving processor 21, control messages that originate from the mobile station. The communication controller 22 also communicates with the ASN-GW via the backbone transceiver 23.

Via the backbone network 3, the backbone transceiver 23 executes transceiving processes for exchanging messages with other base stations. The network configuration information table 24 caches information that indicates which NSPs the current carrier is connected to. The address pointer storage unit 25 stores an address pointer indicating address information for the acquisition location of network configuration information.

Following instructions from the ASN-GW, the network configuration information broadcast processor 22-1 transmits network configuration information to the mobile station via the air interface transceiving processor 21. The network configuration information therein contains configuration information for accessible NSPs and may be, for example, an SII-ADV message (or a Subscriber Station Basic Capability Response (SBC-RSP) message). In addition, where a network configuration information acquisition request is received from the mobile station via the backbone network 3, the network configuration information broadcast processor 22-1 transmits the network configuration information to the mobile station.

Figure 5:
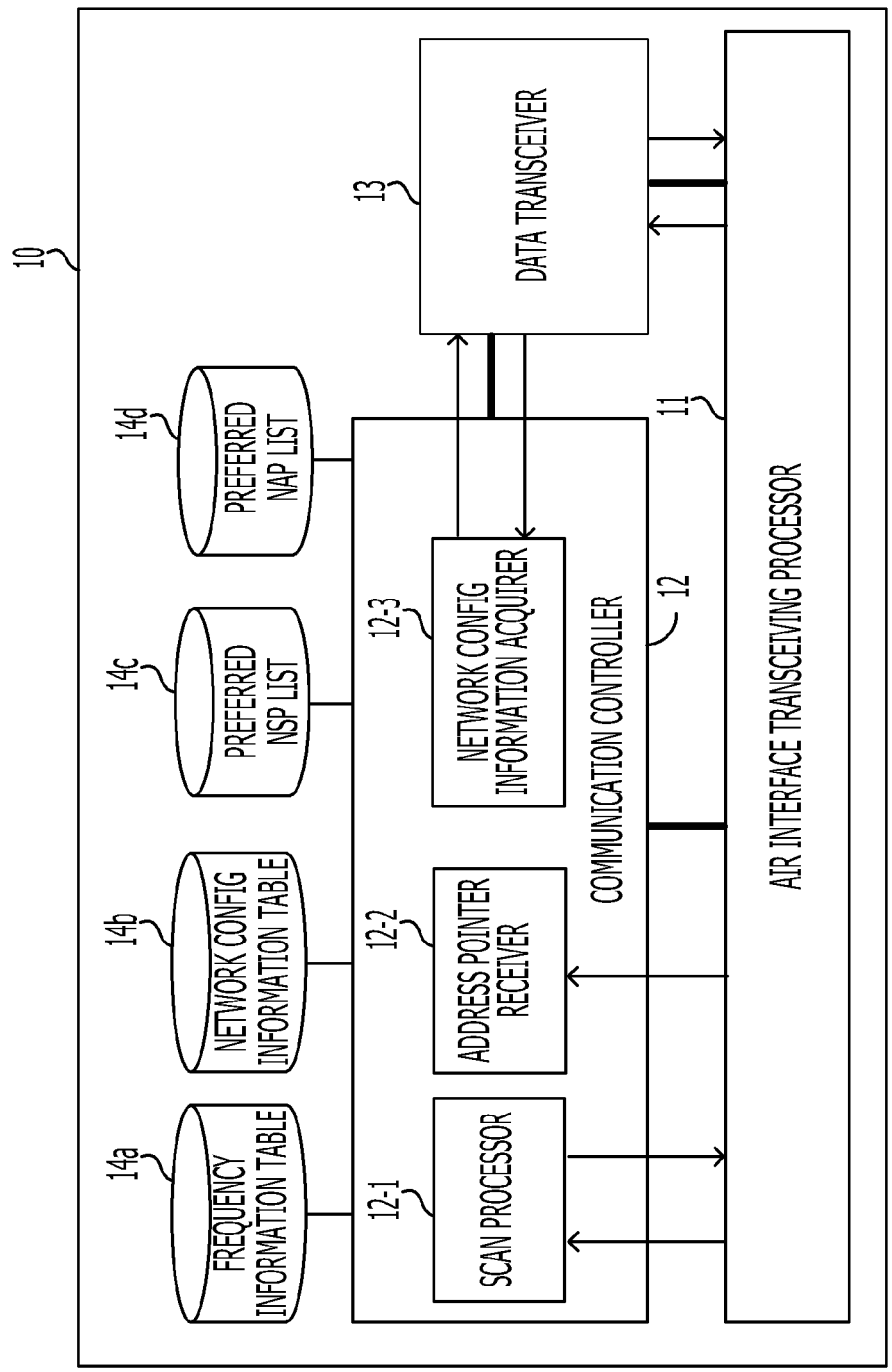
FIG. 5 illustrates an exemplary configuration of a mobile station.

FIG. 5 illustrates an exemplary configuration of a mobile station. The mobile station 10 is provided with an air interface transceiving processor 11, a communication controller 12, and a data transceiver 13. The communication controller 12 includes a scan processor 12-1, an address pointer receiver 12-2, and a network configuration information acquirer 12-3. In addition, the mobile station 10 is provided with the following tables: a frequency information table 14a, a network configuration information table 14b, a preferred NSP list 14c, and a preferred NAP list 14d.

The air interface transceiving processor 11 synchronizes with a frame from a base station and then sends and receives frames over a wireless interface. The communication controller 12 executes processes for maintaining and controlling communication with a base station, as well as exchanging control messages with a base station. In addition, the communication controller 12 sends messages to the air interface transceiving processor 11 and receives control messages that originate from a base station from the air interface transceiving processor 11.

In order to acquire an address pointer to the network configuration information transmitted by a base station, the scan processor 12-1 executes a process to negotiate the time for temporarily disconnecting from the current carrier with a base station of the current carrier and synchronize with another carrier. During the scan process, the scan processor 12-1 sends scan request messages to, and receives scan response messages from, the base station.

The address pointer receiver 12-2 acquires an address pointer transmitted by a base station. In order to acquire the network configuration information for another carrier via the currently-connected carrier, the network configuration information acquirer 12-3 establishes a communication session (such as a Transmission Control Protocol/Internet Protocol (TCP/IP) session) via the current carrier and requests the data transceiver 13 to acquire, for example, network configuration information.

The data transceiver 13 generates a service flow with respect to a carrier, while also establishing a communication session with the data acquisition location specified by the address pointer and then acquiring network configuration information.

The center frequencies used by base stations in a license band, determined by geographic region, are registered in the frequency information table 14a. The network configuration information table 14b is a table for registering and storing carrier network configuration information acquired by the network configuration information acquirer 12-3.

The preferred NSP list 14c is a priority list of NSPs that have been preset in the mobile station. This list is set according to the NSPs that the user wants to use. The preferred NAP list 14d is a priority list of the NAPs that have been preset in the mobile station. This list is set according to the NAPs that the user wants to use.

Operation of the wireless network illustrated in FIG. 3 will now be described for the hypothetical case wherein the mobile station 10 moves from location A, where the carrier #1 is accessible, to location B, where the coverage areas of the carrier #1 and the carrier #2 overlap, and discovers the carrier #2.

At location A, it is herein assumed that the mobile station 10 is connected to a home NSP via a roaming carrier (the carrier #1) that differs from the carrier originally expected for connection.

Herein, the home NSP refers to the NSP with the highest priority. The NSP priority is registered in the preferred NSP list 14c. In this example, the NSP #12 is taken to be the home NSP of the mobile station 10.

In addition, it is assumed that the highest-priority carrier (NAP) of the mobile station 10 is the originally contracted carrier. The NAP priority is registered in the preferred NAP list 14d. In this example, it is assumed that the originally contracted NAP is not found at the location A due to factors such as geographic conditions, and thus the mobile station 10 selects the NAP with the second highest priority registered in the preferred NAP list 14d (i.e., the carrier #1) and establishes a roaming connection.

FIGS. 6A and 6B are sequence diagrams illustrating carrier-switching operation.

[S1] Connected to the roaming carrier (carrier #1), the mobile station 10 sets a timer for checking whether or not the home carrier is present. A trigger for searching for another carrier is regularly produced as a result of the timer expiring.

[S2] In order to scan for another carrier, the mobile station 10 requests the base station BS11 of the carrier #1 for a scan period to set an amount of time during which self-addressed data transmissions from the carrier #1 are stopped.

[S2a] More specifically, when requesting a scan period, the mobile station 10 writes the requested scan period to a scan request message MOB SCN-REQ and transmits the MOB SCN-REQ to the base station BS11.

[S2b] Upon receiving the MOB SCN-REQ, the base station BS11 allows the scan by responding with a scan response message MOB SCN-RSP. The MOB SCN-REQ and MOB SCN-RSP messages herein are defined in IEEE 802.16e.

[S3] Once the scan start time is reached, the base station BS11 temporarily suspends data transmissions addressed to the mobile station 10. Herein, a single temporary suspension of data transmissions lasts for 255 frames at most (5 ms per frame results in 1.275 s at most).

In addition, the mobile station 10 is able to request a plurality of scan periods with a single MOB SCN-REQ. In this case, the base station BS11 alternately suspends and resumes data transmission for a specified number of repetitions.

[S4] The mobile station 10 conducts a control for searching for another base station. During the scan period, the scan processor 12-1 of the mobile station 10 determines the frequencies to search by referencing the frequency information table 14a.

The frequency information table 14a will now be described. FIG. 7 illustrates an exemplary configuration of the frequency information table 14a. The frequency information table 14a includes the following fields: Entry Number, Center Frequency (GHz), and Bandwidth (MHz). When the mobile station 10 knows all center frequencies in use in a given geographical region, all center frequencies are stored in the frequency information table 14a.

The mobile station 10 successively checks whether or not a syncable base station exists on all center frequencies except those of the currently-connected carrier. (The center frequencies used by the current carrier can be ascertained by means of an MOB NBR-ADV or similar control message, for example.)

In other words, in this example, if it is assumed that the currently-connected carrier #1 is using the center frequencies 2.531 GHz, 2.541 GHz, and 2.551 GHz corresponding to entry numbers 4 to 6, then the mobile station 10 attempts to synchronize using the frequencies corresponding to entry numbers 1 to 3.

[S4a, S4b] The mobile station 10 attempts to synchronize on the 2.501 GHz center frequency f5 (entry number 1), but is unsuccessful. The mobile station 10 then attempts to synchronize on the 2.511 GHz center frequency f3 (entry number 2).

[S4c] The mobile station 10 successfully synchronizes on the 2.511 GHz center frequency (entry number 2). As a result, the mobile station 10 receives a DL-MAP containing a Server Pointer IE (i.e., an address pointer) via the base station BS20.

[S4d] The mobile station 10 also attempts to synchronize on the 2.521 GHz center frequency f4 (entry number 3), but is unsuccessful.

The format of the Server Pointer IE (which herein corresponds to the address pointer) will now be described. FIG. 8 illustrates an exemplary format of a Server Pointer IE message. The Server Pointer IE is an information element (IE) transmitted with the DL-MAP by a base station. The Server Pointer IE contains information in the following fields: Extended Downlink Interval Usage Code (DIUC), Length, SII ADV version, and Server Fully Qualified Domain Name (FQDN).

In this example, the Server Pointer IE includes the domain name (Server FQDN) of a device (i.e., a server) from which network configuration information for the carrier can be acquired. This server is assumed to exist at the base station BS20. Herein, the SII ADV version is version information for the SII-ADV message (i.e., the network configuration information).

[S5] Once the scan period ends, the mobile station 10 reverts the frequency to that of the carrier #1, and resumes data communication with the carrier #1.

[S6] The base station BS11 then resumes the transmission of data addressed to the mobile station 10.

[S7] From the domain name contained in the acquired Server Pointer IE, the mobile station 10 acquires the IP address of the server by using the Domain Name System (DNS), for example. (A DNS server may be disposed within the NSP #2, for example.) The mobile station 10 then establishes a communication session with the server at that IP address via the carrier #1. Herein, it is assumed that a TCP/IP session is established. The route of the established communication session is as follows: mobile station 10—base station BS11—ASN-GW 1a—backbone network 3—ASN-GW 2a—base station BS20.

[S8] Once the TCP/IP session has been established, the mobile station 10 sends an SII-ADV request message via the session.

The format of the SII-ADV request message the mobile station 10 sends will now be described. FIG. 9 illustrates an exemplary format of an SII-ADV request message. The SII-ADV request message contains information in the following fields: Management message type (=70), Type Length Value (TLV) type (=150), Length, MS IP Address, TLV type (=151), Length, and NAP-ID.

The SII-ADV request message contains the IP address of the mobile station 10 (the MS IP Address), and the NAP-ID, which indicates the particular NAP for which the mobile station 10 is requesting an SII-ADV. Furthermore, since the message herein is sent as TCP data, its format may also differ from the format of WiMAX messages.

[S9] Once the base station BS20 on the carrier #2 receives the SII-ADV request message, it sends an SII-ADV message to the mobile station 10 over the TCP/IP session via the backbone network 3.

The format of the SII-ADV message the base station BS20 on the carrier #2 sends will now be described. FIG. 10 illustrates an exemplary format of an SII-ADV message. The SII-ADV message contains information in the following fields: Management Message Type, TLV type (=133), Length, NSP-ID (1) to (n), TLV type (=132), Verbose NSP Name Length (1) to (n), and Verbose NSP Name (1) to (n). The information stored in these respective fields is described below.

Management Message Type: a message type indicating that the message is an SII-ADV message, defined to be 0x68 in IEEE 802.16e-2005.

TLV type (=133): indicates the TLV for enumerating the identifiers of NSPs accessible from the NAP.

Length: indicates the total size of the identifiers of NSPs accessible from the NAP.

NSP-ID (1) to (n): identifiers that identify NSPs accessible from the NAP.

TLV type (=132): indicates the TLV for expressing NSPs accessible from the NAP.

Verbose NSP Name Length (1) to (n): respectively indicate the total size of individual information elements expressing the names of NSPs accessible from the NAP.

Verbose NSP Name (1) to (n): the detailed names of respective NSPs accessible from the NAP.

[S10] The network configuration information acquirer 12-3 of the mobile station 10 receives the SII-ADV message and registers the message's contents in the network configuration information table 14*b*.

Exemplary information set in the network configuration information table 14*b*, illustrated in FIG. 11, will now be described. The network configuration information table 14*b* is contains the following fields: NAP-ID (24-bit), Candidate ID, NSP-ID (24-bit), and Verbose NSP Name.

In this example, the mobile station 10 has successfully synchronized with the base station BS20 at the center frequency f3, and thus only the network configuration information that was acquired from the carrier #2 is registered in the network configuration information table 14*b*.

First, the mobile station 10 is able to ascertain the NAP-ID from the DL-MAP that it received in step S4*c*. The mobile station 10 then sets the NSP-ID and the Verbose NSP Name from the information contained in the SII-ADV message. The SII-ADV message in this case is the message acquired from the server of the carrier which sent the DL-MAP, indicated by the Server Pointer IE.

In this example, the generated table is shown to contain a first provider having the NSP-ID 0xBBBBBB and the name "Nocty Communication", as well as a second provider having the NSP-ID 0xCCCCCC and the name "BAGLOBE Corporation".

[S11] Referencing the preferred NSP list 14*c*, the mobile station 10 checks whether or not the discovered carrier has a higher connection priority than the currently-connected carrier. If the carrier #2 has a higher connection priority than the carrier #1, then the process proceeds to step S12. If not, communication continues with the carrier #1.

The preferred NSP list 14*c* and the preferred NAP list 14*d* will now be described. FIG. 12 illustrates an exemplary configuration of a preferred NSP list 14*c*. The preferred NSP list 14*c* contains the following fields: Priority, Preferred NSP, and NSP-ID (24-bit).

The information in the preferred NSP list 14*c* is set by the user or operator in advance. Herein, Nocty (NSP-ID=0xBBBBBB) is registered as the first priority, and BAGLOBE (NSP-ID=0xCCCCCC) is registered as the second priority.

FIG. 13 illustrates an exemplary configuration of the preferred NAP list 14*d*. The preferred NAP list 14*d* contains the following fields: Priority, Preferred NAP, and NAP-ID (24-bit). The information in the preferred NAP list 14*d* is similarly set by the user or operator in advance. Herein, TTC (NAP-ID=0x333333) is registered as the first priority, Wireless ONE (NAP-ID=0x222222) is registered as the second priority, and Eastern Telecom (NAP-ID=0x111111) is registered as the third priority.

In this example, the network configuration information table 14*b* is first searched using the first priority NSP (NSP-ID=0xBBBBBB) in the preferred NSP list 14*c* as the search term. The first entry is found as a result, and from the network configuration information table 14*b* the mobile station 10 learns that the NSP (NSP-ID=0xBBBBBB) can be reached via the NAP (NAP-ID=0x222222).

The preferred NAP list 14*d* is next referenced, and although the first priority NAP (NAP-ID=0x333333) is unsuccessfully accessed, the second priority NAP (NAP-ID=0x222222) is successfully accessed, and the mobile station 10 learns that the second priority NAP (NAP-ID=0x222222) has a higher priority than the currently-connected carrier #1 (NAP-ID=0x111111). Consequently, the communication controller 12 of the mobile station 10 determines that the NSP (NSP-ID=0xBBBBBB) will be accessed via the NAP (NAP-ID=0x222222).

[S12] The mobile station 10 issues a request to disconnect from the carrier #1.

[S12*a*] The mobile station 10 sends DREG-REQ, a disconnect request message.

[S12*b*] The mobile station 10 receives DREG-RSP, a disconnect response message, and disconnects. The DREG-REQ and DREG-RSP messages herein are defined in IEEE 802.16e.

[S13] The mobile station 10 releases synchronization with the carrier #1.

[S14] The mobile station 10 initiates a connection to the carrier #2.

[S15] The mobile station 10 executes protocols for connecting to the carrier #2 with the base station BS20. More specifically, the protocols for network entry involve the following. The mobile station 10 sends an RNG-REQ to the base station BS20 on the carrier #2. Upon receiving the RNG-REQ, the base station BS20 sends an RNG-RSP message to the mobile station 10.

The mobile station 10 next exchanges SBC-REQ/RSP messages, PKM-REQ/RSP messages, and REG-REQ/RSP messages with the base station BS20, and completes network entry.

In the foregoing, the Server Pointer IE is taken to include the domain name of a server from which the network configuration information of a carrier can be acquired. The server is taken to exist at the base station BS20. However, such a server may also exist at the ASN-GW 2a. In this case, when the ASN-GW 2a is accessed from the mobile station 10 via the carrier #1, the ASN-GW 2a sends an SII-ADV message to the mobile station 10 via the backbone network 3 and the carrier #1. It is worth noting that the Server Pointer IE is not limited to being the domain name of the server; it may also be the address itself that is assigned to the server on the network, or an identifier assigned to the server in order to distinguish it from the base stations and the ASN-GWs. Moreover, a plurality of pointer information pointing to such servers may be registered in the mobile station in advance. Having done so, the Server Pointer IE may then be configured to specify an index that identifies one set of pointer information from among the plurality of pointer information stored in the mobile station.

Also, as shown in FIG. 8, version number information for the SII-ADV message is included in the Server Pointer IE. Such version number information may be used in the mobile station 10 to acquire the most up-to-date SII-ADV message. In other words, a comparison may be made between the SII-ADV version number information contained in a previously acquired Server Pointer IE, and the SII-ADV version number information contained in the currently-acquired Server Pointer IE. If the version number information has been updated, then the mobile station 10 re-accesses the Server Pointer IE containing the new version number information, and acquires the most up-to-date SII-ADV message.

As the foregoing describes, a wireless communication system 1 has the following configuration. When searching for another carrier #2 from a currently-connected carrier #1, a mobile station 10 temporarily receives wireless communication from the carrier #2 and obtains an address pointer for acquiring network configuration information for the carrier #2. The mobile station 10 then accesses the data acquisition location specified by the address pointer via the currently-connected carrier #1 and acquires network configuration information for the carrier #2. By doing this, it becomes possible to restrain the amount of time during which communication between the mobile station 10 and the currently-connected carrier #1 is interrupted. As a result, the communication cut-off time is greatly shortened, making it possible to improve communication quality.

Next, a modification will be described. In the foregoing description, once the mobile station 10 receives a Server Pointer IE from the base station BS20 on the carrier #2, the mobile station 10 disconnects from the base station BS20 and reconnects with the base station BS11 on the carrier #1. The mobile station 10 subsequently acquires an SII-ADV message for the carrier #2 over the backbone network 3 via the base station BS10 of the carrier #1.

In contrast, in this modification, once the mobile station 10 receives a Server Pointer IE from the base station BS20 on the carrier #2, the mobile station 10 does not disconnect from the base station BS20. Instead, it accesses the data acquisition location specified by the Server Pointer IE from the base station BS20 and acquires the SII-ADV message for the carrier #2 from the base station BS20.

In some cases, the wireless communication status of the carrier #2 may indicate that the ASN-GW 2a is experiencing high load because a large number of mobile stations are connected to the carrier #2. Alternatively, traffic on the backbone network 3 may be congested. In such circumstances, the mobile station 10 may receive the SII-ADV message directly from the base station BS20 on the carrier #2 without communicating via the ASN-GW 2a and the backbone network 3.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A wireless communication system, comprising:
   a first wireless base station disposed on a first wireless network;
   a second wireless base station disposed on a second wireless network; and
   a mobile station that includes a wireless communication controller;
   wherein
   in the case where the mobile station attempts to switch communication to the second wireless network while coupled to the first wireless network, the communication controller
   temporarily synchronizes with the second wireless base station and obtains an address pointer for acquiring network configuration information regarding the second wireless network from the second wireless base station, and
   after obtaining the address pointer, the communication controller recouples with the first wireless base station, accesses the data acquisition location specified by the address pointer via the first wireless network, and acquires the network configuration information.

2. The wireless communication system according to claim 1, wherein
   in the case where the data acquisition location specified by the address pointer indicates the second wireless base station, the communication controller
   initiates a communication session with the second wireless base station via the first wireless network and acquires the network configuration information stored in the second wireless base station via the communication session.

3. The wireless communication system according to claim 1, wherein
   the address pointer contains version number information with respect to the network configuration information, and
   the communication controller compares the version number information contained in a previously acquired address pointer to the version number information contained in the currently acquired address pointer, and in the case where the version number information has been updated, the communication controller re-accesses the address pointer containing the new version number information and acquires the network configuration information.

4. The wireless communication system according to claim 1, further comprising:

a gateway apparatus disposed on the second wireless network, and configured to send a command to the subordinate second wireless base station instructing the second wireless base station to send the address pointer;

wherein in the case where the data acquisition location specified by the address pointer indicates the gateway apparatus, and also wherein the gateway apparatus is accessed from the mobile station via the first wireless network, the gateway apparatus sends the network configuration information to the mobile station via the first wireless network.

5. A mobile station, comprising:

a transceiver that sends and receives wireless signals; and
a wireless communication controller;

wherein in the case where the mobile station attempts to switch communication to a second wireless network, including a second wireless base station, while coupled to a first wireless base station in a first wireless network and communicating on the first wireless network, the communication controller temporarily synchronizes with the second wireless base station, obtains an address pointer for acquiring network configuration information from the second wireless base station containing information regarding the network configuration of the second wireless network, and after obtaining the address pointer, the communication controller recouples with the first wireless base station, accesses the data acquisition location specified by the address pointer via the first wireless network, and acquires the network configuration information.

6. The mobile station according to claim 5, wherein in the case where the data acquisition location specified by the address pointer indicates the second wireless base station, the communication controller initiates a communication session with the second wireless base station via the first wireless network, and acquires the network configuration information stored in the second wireless base station via the communication session.

7. The mobile station according to claim 5, wherein the address pointer contains version number information with respect to the network configuration information, and the communication controller compares the version number information contained in a previously acquired address pointer to the version number information contained in the currently acquired address pointer, and in the case where the version number information has been updated, the communication controller re-accesses the address pointer containing the new version number information and acquires the network configuration information.

8. A wireless base station, comprising:

a communication controller that controls wireless communication with a mobile station;

a network configuration information communication unit that communicates network configuration information, the network configuration information containing information regarding the network configuration of the wireless network onto which the wireless base station is disposed; and an address pointer storage unit that stores an address pointer indicating the acquisition location of the network configuration information;

wherein the communication controller sends the address pointer to the mobile station, and in the case where the data acquisition location specified by the address pointer indicates the wireless base station, the network configuration information communication unit sends the network configuration information to the mobile station via the wireless network to which the mobile station is coupled.

* * * * *